United States Patent
Goyal

(10) Patent No.: US 10,846,377 B2
(45) Date of Patent: Nov. 24, 2020

(54) SECURE FILE SHARING USING SEMANTIC WATERMARKING

(71) Applicant: Citrix Systems, Inc., Fort Lauderdale, FL (US)

(72) Inventor: Ashish Goyal, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 138 days.

(21) Appl. No.: 15/998,862

(22) Filed: Aug. 17, 2018

(65) Prior Publication Data

US 2020/0057843 A1  Feb. 20, 2020

(51) Int. Cl.
| | |
|---|---|
| *H04L 29/06* | (2006.01) |
| *G06F 21/62* | (2013.01) |
| *G06F 21/16* | (2013.01) |
| *G06F 16/176* | (2019.01) |
| *G06F 40/30* | (2020.01) |

(52) U.S. Cl.
CPC ............ *G06F 21/16* (2013.01); *G06F 16/176* (2019.01); *G06F 21/6227* (2013.01); *H04L 63/08* (2013.01); *G06F 40/30* (2020.01); *G06F 2221/0733* (2013.01)

(58) Field of Classification Search
CPC .... G06F 21/16; G06F 16/176; G06F 21/6227; G06F 40/30; G06F 2221/0733; G06F 21/62; G06F 21/10; H04L 63/08; H04L 29/06

See application file for complete search history.

(56) References Cited

U.S. PATENT DOCUMENTS

| | | | | |
|---|---|---|---|---|
| 6,086,706 A | * | 7/2000 | Brassil | G03G 21/04 156/277 |
| 7,958,147 B1 | * | 6/2011 | Turner | G06F 21/604 707/783 |
| 9,298,915 B2 | * | 3/2016 | Goddard | G06F 21/62 |
| 2002/0126869 A1 | * | 9/2002 | Wang | H04N 1/32315 382/100 |
| 2002/0184159 A1 | * | 12/2002 | Tadayon | G06Q 10/10 705/54 |
| 2003/0028801 A1 | * | 2/2003 | Liberman | G06F 40/166 726/31 |

(Continued)

OTHER PUBLICATIONS

Jardin, Xeni, "Putting a Watermark on Oscar Film 'Screeners'," Jan. 12, 2006, NPR Sepcial Serial, accessed Aug. 16, 2018 from <https://www.npr.org/templates/story/story.php?storyId=5151434>, 7 pages.

*Primary Examiner* — Jayesh M Jhaveri

(74) *Attorney, Agent, or Firm* — Banner & Witcoff, Ltd.

(57) ABSTRACT

Methods and systems for identifying a source of leak of confidential information are described herein. The methods and systems related to a file sharing system that may generate a copy of a shared file that is unique each user. The file management system may determine a plurality of differences within each version of the file. A table of differences is maintained by the file management system, for comparison against any leaked version of the file. The file management system compares each generated version of the file against previously generated versions to ensure enough differences are included to determine a unique identity of the user associated with any leaked file.

20 Claims, 7 Drawing Sheets

(56) References Cited

U.S. PATENT DOCUMENTS

| | | | |
|---|---|---|---|
| 2004/0184065 A1* | 9/2004 | Guan | G06F 21/10 358/1.14 |
| 2006/0075004 A1* | 4/2006 | Stakutis | G06F 16/10 |
| 2011/0087600 A1* | 4/2011 | Cohen | G06Q 30/0607 705/51 |
| 2012/0320403 A1* | 12/2012 | Kakutani | H04N 1/00846 358/1.14 |
| 2016/0283495 A1* | 9/2016 | Shaath | G06F 16/122 |

* cited by examiner

FIG. 7

- S701 Leaked Document Input
- S702 File Sharing Document Analysis
- S703 Watermarking Storage
- S704 Difference Comparison Analysis
- S705 Unique Copy Probability Score Generation
- S706 User Probability Output

SECURE FILE SHARING USING SEMANTIC WATERMARKING

FIELD

Aspects described herein generally relate to computers, networking, hardware, and software, cryptography, and security measures in place therein. More specifically, one or more aspects of the disclosure relate to secure file management services, and in particular, relate to using automatically generated intelligent or invisible watermarking and validation techniques with secure file management services.

BACKGROUND

Information rights management (IRM) traditionally includes technologies that protect sensitive information from unauthorized access. IRM technology may allow for information, often in the form of documents, images or videos, to be controlled by a creator while the information is being used by others. Those features may include information encryption and permissions management. Traditionally, an IRM protection system may disable certain file management features.

IRM may protect, control, and limit access to the information or alteration of the information when the information is in use. Information encryption solutions use encryption to prevent unauthorized access. For example, a key or password may be used to control access to the encrypted data. Functionalities of the program used to access, alter, or create digital or physical copies of protected file information may be limited through encryption of password protection, but the legitimate file accesses may still create the potential for leaks. For example, a system may prevent computer print screen functions, prevent printing or editing, prevent copying of data to an insecure environment, and guard documents, images or videos from attack meant to disable protections, controls, and limits on information.

Traditional watermarking solutions may provide obvious indicators that information is desired to be treated as confidential. For example, watermarks may include indicators such as an identifying image or pattern in the image (or paper of printed copies) that may appear behind document text. The watermark may include various shades of lightness/darkness when viewed under certain conditions (or various thickness or density variations in the paper copies). While those solutions identify the intended confidentiality, they are generally not user specific, and do not generally assist in identifying a source of a leak. Additionally, people may defeat such background watermarks from typing out text or screenshotting images or text.

Digital or printed versions of a file may include hidden watermarks or metadata that may identify the creator, even if the user is unaware of such identifiers. However, while such IRM solutions discourage file theft, they do not prevent a file from being recreated without a digital transfer. For example, screenshotting a document or manually duplicating content by having a third party recreate the content word for word by retyping it on another machine. Further, in many industries, multiple copies of a document are in the possession of different users, who may access the document from different locations, with different devices, over different networks, and under other conditions that may compromise a document's security.

For example, consider the case of a studio which is working on producing a TV show or a movie. Multiple items, including scripts and production documents, may need to be shared. The parties accessing these documents may include a large number of users, including parties from within different companies who may be contracting on a portion of a production. Each of the parties may have different levels of interests in the security of the document. In many cases, a script may be considered highly confidential information, and the leak of a script may diminish the value of a production significantly, as the end product may be less interesting the a user who has knowledge of the story. Additional any leaked script may result in ideas being stolen by other producers of content.

No file sharing solution or information rights management (IRM) solution provides protection against all types of file leaks. For example, there may be no protection against screenshot pictures of a document or manually copying the content of a document that is legitimately accessed. If the source of such a leak was detectable, further leaks may be prevented and recovery proceedings can be initiated. The availability of user specific identification of such a leak will also act as a huge deterrent against the leak occurring in the first place. If it is possible to detect a source of the leak, preventative actions including legal proceedings may be initiated to prevent disclosure or recover costs. Additionally, after leaks are detected, any preventative actions will act as a deterrent against future leaks. While IRM solutions may protect against certain kinds of file transfers or digital reproductions, there is no protection against taking screenshots of a document or manually copying the content of a document. The following solution seeks to address these problems.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards a method including: receiving, by a computing device, a file from a user, the file to be shared with a plurality of secondary users; determining, by the computing device, a plurality of semantic differencing elements based on the file received from the user; generating, by the computing device and for each of the plurality of secondary users, a copy of the file based on the plurality of semantic differencing elements; generating, by the computing device and for each copy of the file, a record that associates the copy of the file with a secondary user and identifies at least one semantic difference between the file and the copy of the file.

In some examples, the method may include receiving, by the computing device, a request to access the file; authenticating, by the computing device, a secondary user based on user authentication data; logging, by the computing device, the user authentication data and access information; and after authenticating the secondary user, providing access to the copy of the file associated with the secondary user. The user authentication data may be associated with a copy of the file assigned to the secondary user, and the access information may be associated with the copy of the file assigned to the secondary user and may comprise a time and date of each access to the copy of the file by the secondary user. The generating, by the computing device and for each of the plurality of secondary users, the copy of the file based on the plurality of semantic differencing elements further may comprises generating a difference score for the copy of the file; comparing, by the computing device, the difference score to a threshold; and after the difference score satisfies the threshold, providing a secondary user access to the copy of the file associated with the secondary user.

In addition, the method may include determining a number of differences between the copy of the file and the file; determining numbers of differences between each copy of the file; determining the difference score based on the number of differences between the copy of the file and the file and based on the numbers of differences between the each copy of the file; receiving, by the computing device, a recovered file; comparing, by the computing device, the recovered file to differences associated with the file; determining, based on the comparing, a secondary user associated with the recovered file; determining a portion of the file to which the recovered file corresponds; retrieving a portion of the plurality of semantic differencing elements, associated with the file, corresponding to the portion of the file to which the recovered file corresponds; comparing the recovered file to the portion of the file to which the recovered file corresponds; determining, based on the comparing of the recovered file to differences associated with the file, a probability score for each copy of the file; providing a ranking of each copy of the file based on the probability score for each copy of the file; providing, to the user, information identifying the secondary user associated with the recovered file and information about the recovered file based on the differences associated with the file.

In some embodiments, the disclosure relates to an apparatus including at least one processor; and memory storing executable instructions that, when executed by the at least one processor, cause the apparatus to: process a file, to be shared with a plurality of secondary users, to determine a plurality of semantic differencing elements based on the file received from the user; generate, for each of the plurality of secondary users, a copy of the file for each of the plurality of secondary users based on the plurality of semantic differencing elements; store, for each copy of the file assigned to one of the plurality of secondary users and with the file, a record of a plurality of changes to the file made to generate each copy of the file; receive a request to access the file; authenticate a secondary user based on user authentication data; and log the user authentication data and access information of the secondary user. The user authentication data is associated with a copy of the file assigned to the secondary user, and the access information is associated with the copy of the file assigned to the secondary user and comprises a time and date of access to the copy of the file by the secondary user. Additional examples of the disclosure relates to an apparatus including at least one processor; and memory storing executable instructions that, when executed by the at least one processor, cause the apparatus to: generate a difference score for the copy of the file; compare the difference score to a threshold; after the difference score satisfies the threshold, provide a secondary user access to the copy of the file associated with the secondary user; receive a recovered file; compare the recovered file to differences associated with the file; determine, based on a comparison of the recovered file and the file, one of the plurality of secondary users associated with the recovered file; determine a portion of the file to which the recovered file corresponds; retrieve a portion of the plurality of semantic differencing elements, associated with the file, corresponding to the portion of the file to which the recovered file corresponds; compare the recovered file to semantic differencing elements of the portion of the file to which the recovered file corresponds; determine, based on comparing the recovered file to differences associated with the file, a probability score for each copy of the file; and provide a ranking of each copy of the file based on the probability score for each copy of the file.

Furthermore, aspects may take the form of a computer program product stored by one or more non-transitory, tangible computer-readable storage media having computer-readable program code, or instructions, embodied in or on the storage media. For example, in one example, a non-transitory computer-readable medium may store computer-executable instructions, which when executed by a computer processor, cause a computerized system to perform one or more of the following: receive a file from a user, the file to be shared with a plurality of secondary users; determine a plurality of semantic differencing elements based on the file received from the user; generate, for each of the plurality of secondary users, a copy of the file based on the plurality of semantic differencing elements; generate, for each copy of the file, a record that associates the copy of the file with a secondary user and identifies at least one semantic difference between the file and the copy of the file; receive a request to access the file; authenticate a secondary user based on user authentication data; and log the user authentication data and access information. The user authentication data may be associated with a copy of the file assigned to the secondary user, and the access information is associated with the copy of the file assigned to the secondary user and comprises a time and date the copy of the file is accessed.

Additional examples of a non-transitory computer-readable medium may store computer-executable instructions, which when executed by a computer processor, cause a computerized system to perform one or more of the following: generate a difference score for the copy of the file; compare the difference score to a threshold; after the difference score satisfies the threshold, provide a secondary user access to the copy of the file associated with the secondary user; receive a recovered file; compare the recovered file to differences associated with the file; and determine, based on a comparison of the recovered file to the file, a user associated with the recovered file.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 7 depicts an illustrative leaked file discovery process.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards controlling shared documents in an enterprise computing system using managed applications at computing devices. A document manager may perform file analysis for intelligent watermarking and generate clone copies of a file to be shared. Each clone copy may include a plurality of semantic watermarks, which may include a variety of changes to files that not intended to be recognizable to the end user. For example, for a text document, semantic watermarks may include changes like inserting/removing additional punctuation marks, using synonyms, and expanding/shortening phrases like "is not" to "isn't" and vice versa. Those processes may provide each user or device a unique version of a file, though the semantic differences between the files should not be readily apparent the user. If one of the clone files is leaked and the leaked document is recovered, the recovered file may be compared to a database or table of stored semantic watermarks. In this way, the document manager may determine the users associated with any leaked files. As a result, the leaking of files provided over a cloud or network storage device may be prevented or deterred.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
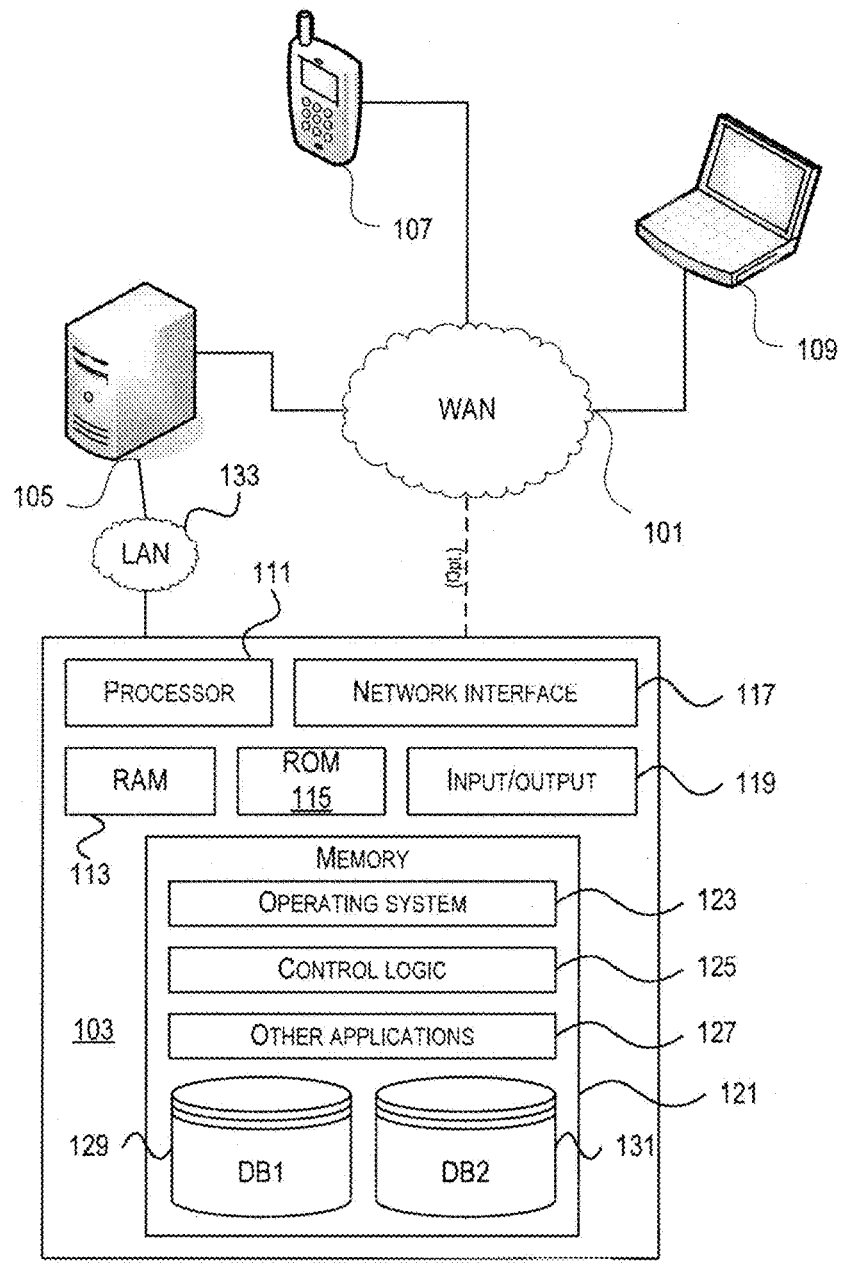
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like.

Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device. 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
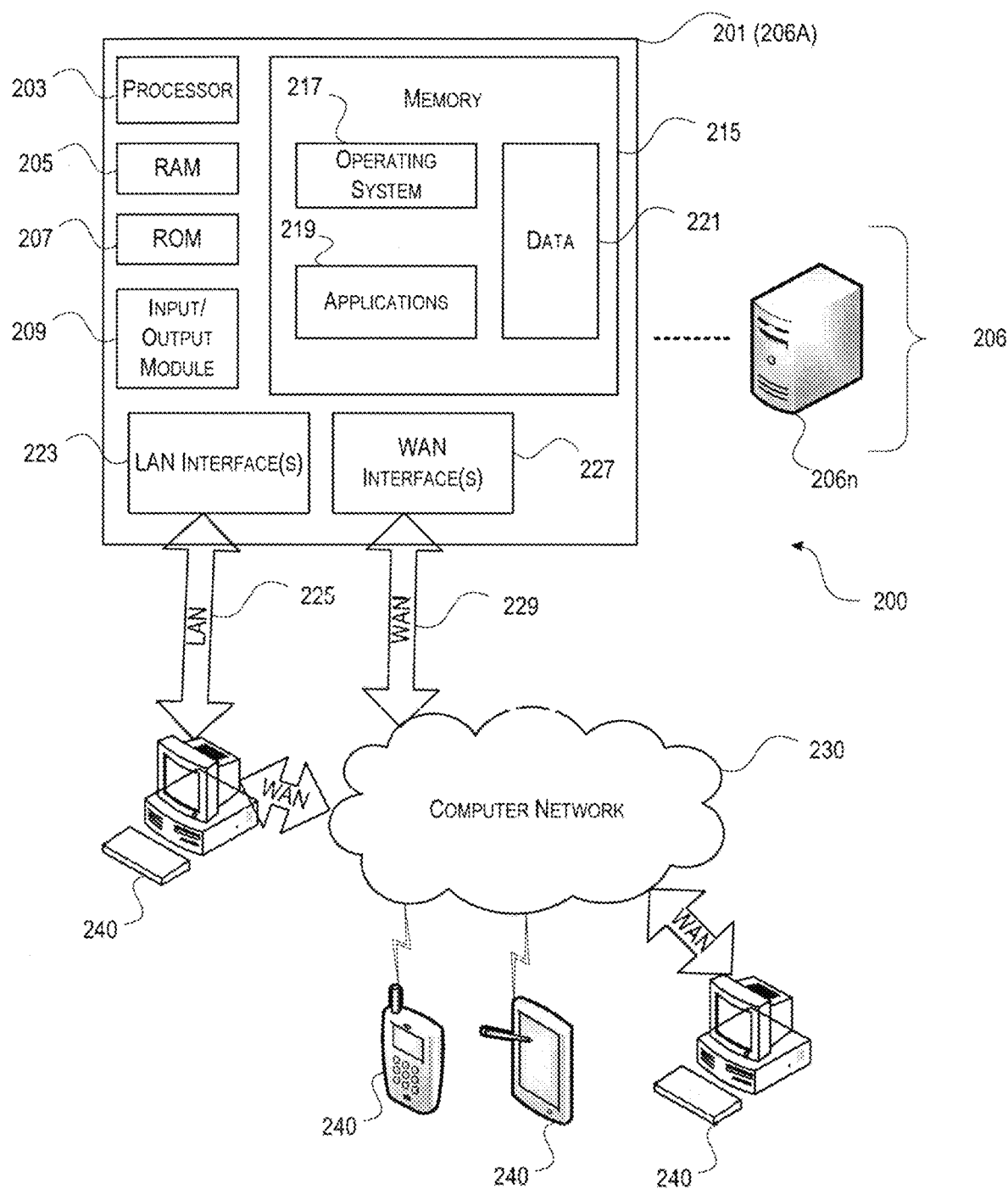
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) configured to provide virtual machines for client access devices. The computing device 201 may have a processor 203 for controlling overall operation of the server 206a and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
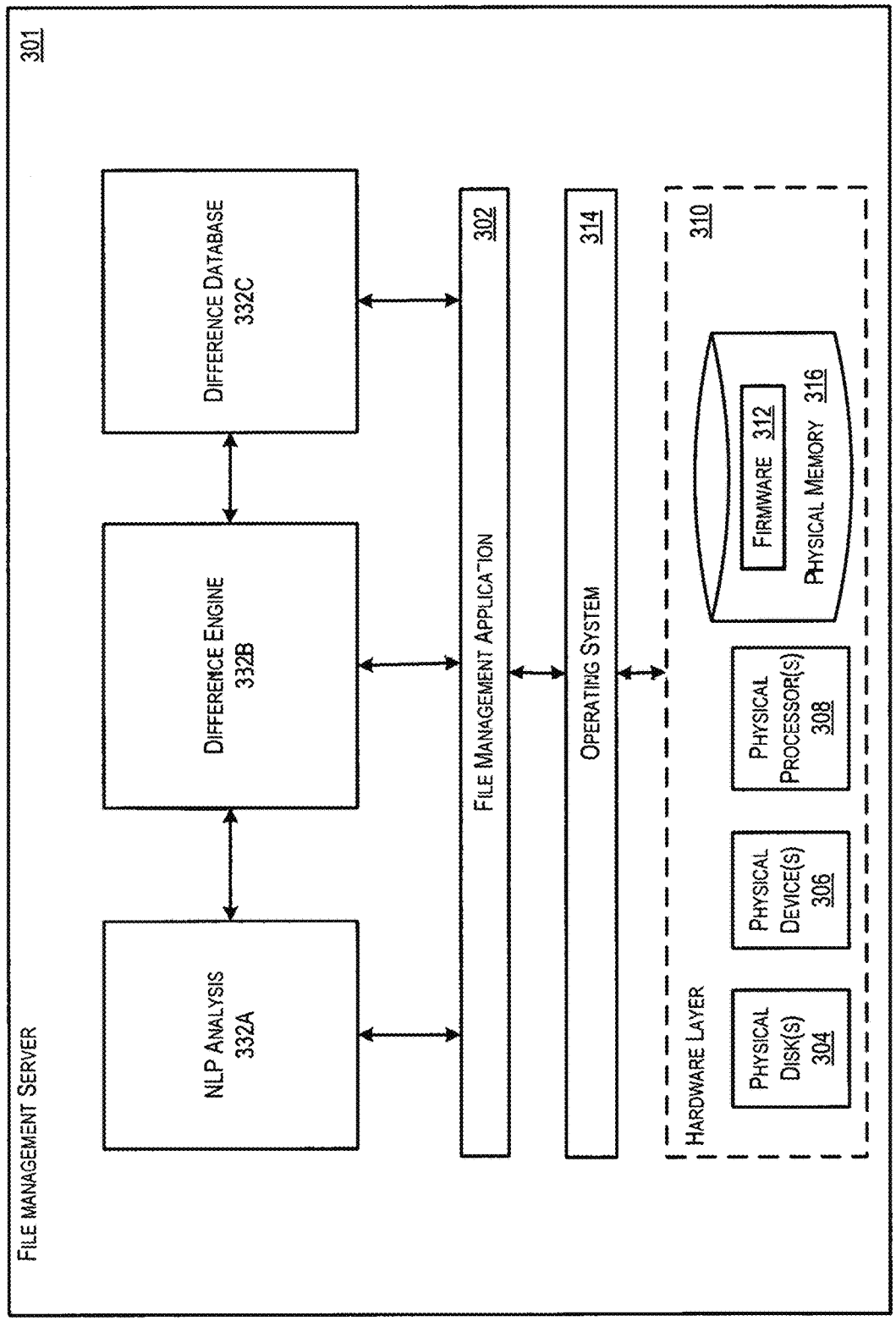
FIG. 3 depicts an illustrative file management system architecture that may be used in accordance with one or more illustrative aspects described herein.

FIG. 3 shows a high-level architecture of an illustrative document management system. As shown, the document management system may be single-server or multi-server system, or cloud system, including at least one file management server 301 configured to provide file management applications to one or more client devices 240. Document management processes may include programs that execute after a file has been stored with a file sharing application.

A file management server 301 may be configured as a single-server, multi-server, or cloud computing environment. File management server 301 illustrated in FIG. 3 can be deployed as and/or implemented by one or more embodiments of the server 206 illustrated in FIG. 2 or by other known computing devices. Included in file management server 301 is a hardware layer 310 that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. File management server 301 may further include an operating system 314 that may be stored in a memory element in the physical memory 316 and executed by one or more of the physical processors 308. Still further, a file management application 302 may be stored in a memory element in the physical memory 316 and can be executed by one or more of the physical processors 308.

The file management application 302 of FIG. 3 may provide user specific identifiers or watermarks for multiple copies of a document. The document management system may analyze a document for language and style choices which may be altered, may generate an index of possible changes to each document, and may generate at least one clone copy of a document upon request for each particular recipient. Each clone copy of the document may include a number of changes which make the document identifiable, but which are impossible for a user to identify. The system may create a record of the changes associated with a user specific version of a document, so the document may be associated with a particular user if it is leaked or stolen. The record may be used to assist in the generation of additional documents, and ensure that each copy of a document is significantly distinguishable. Each of these tasks may be implemented in the file management application 302 so that user specific copies of a document are auto generated and distributed without additional input from the file sharing software manager.

A wide variety of changes may be implemented by the file management application 302. For example, the system may alter documents by inserting or removing commas, or inserting or removing dashes. The use of hyphens to break words across two lines, or hyphens may be added or removed to certain words.

To prevent screenshotting, changes in paragraph formatting may be added. For example, file management application 302 may change the amount of indentation used before the start of any paragraph, or may change the justification of paragraph text (e.g. left justify or block formatting). Paragraph formatting may also alter a numbering system for paragraphs. The system may also make small changes to alter the paginations, such as keeping certain sentences together. For example, an orphan control system may prevent a single line of a particular paragraph from being presented on a new page. Such control may keep two lines of text together or may ensure that whole paragraphs are kept on a single page, which may result in paragraphs being presented on different pages.

Text may also be selectively displayed in a different style. For example, selective texts, such as section headers, may be presented with different levels of emphasis. The text may be altered to include bolded, underlined, or italicized text. Text identified as bolded, underlined, or italicized in an original document may be determined to be presented in a different manner.

While the disclosure is generally directed to processing text documents, the disclosed systems and methods may also be applied to image and video files. For image files, the system may manipulate pixels and modifying original image such that changes from the source shared file are not obviously visible to human eyes, though such differences may become apparent if multiple clone versions are compared. Similarly, for a video file, the system may apply image processing to generate differences throughout the video file. The video processing may alter a video by applying the above image techniques for individual frames, for example.

Executing on one or more of the physical processors 308 may be one or more document management processes 332A-C (generally 332). Each document management process 332 may be an independent application or function, or may be an integrated element of the file management application 302. In some embodiments, a natural language processing (NPL) application 332A may execute a document analysis routine, discussed in detail below, to determine file segments for further processing. A difference engine 332B, may take the determined file segments from the natural language processing application 332A and generate a large number of possible alternative file segments for generating clone documents. The difference engine 332B may generate other changes that act as semantic watermarks in the file. As opposed to traditional watermarks, the semantic watermarks generated by the difference engine may unnoticeable to a user without direct comparison to another clone document or to the source document. A difference database 332C may be a searchable table or database that is unique for each file. Based on the alternative file segments generated by the difference engine 332B, a plurality of differences serving as user unique watermarks for each unique copy of a file may be stored in the difference database 332C. The plurality of differences may be searched or queried for validation processes to ensure significant differences between clones of the same source document and for leak recovery analysis.

File management server 301 may include a hardware layer 310 with one or more pieces of hardware that communicate with the file management server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with file management server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of file management server 301. Programs or executable instructions stored in the physical memory 316 can be executed by the one or more processors 308 of file management server 301.

Figure 4:
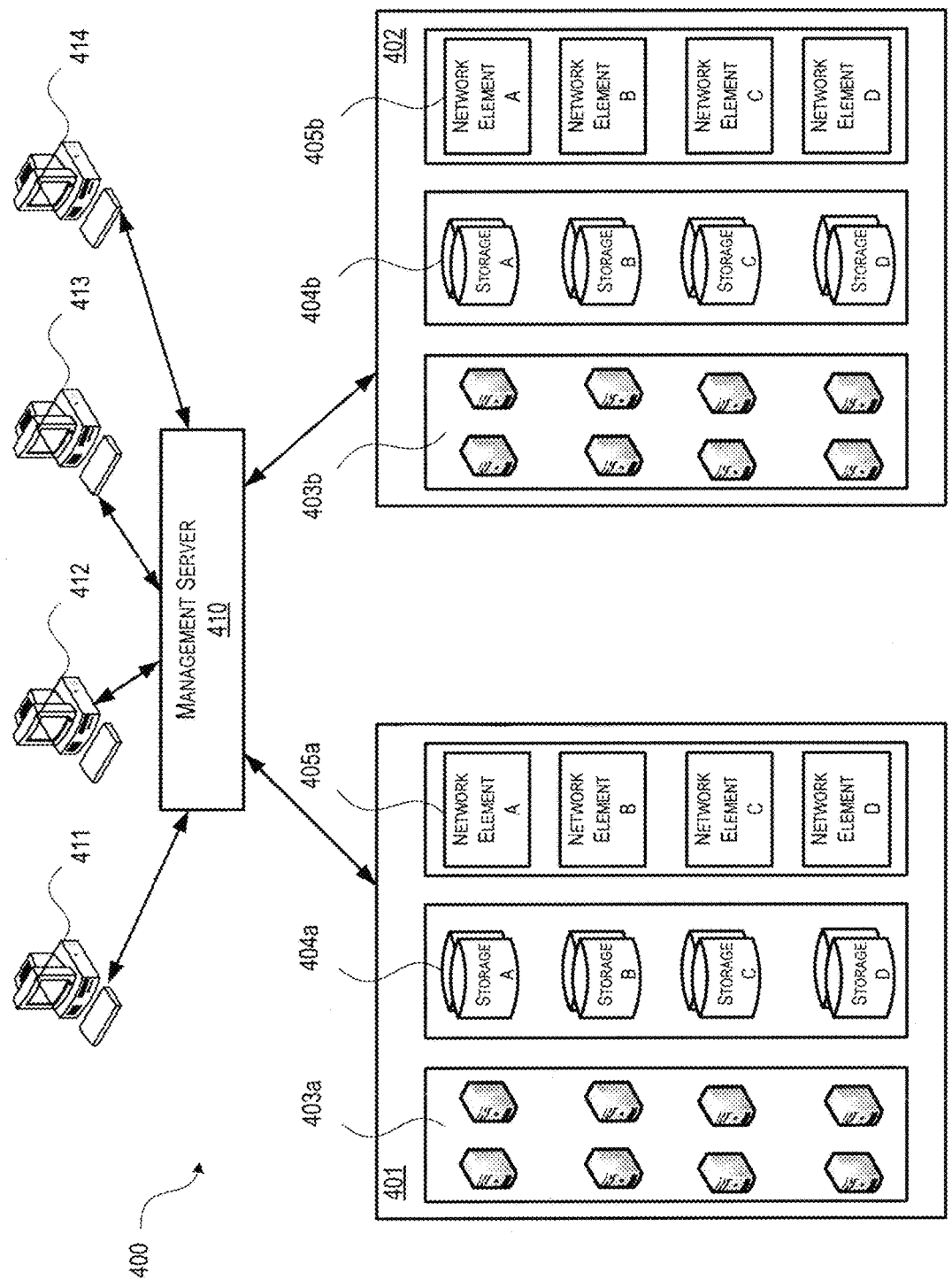
FIG. 4 depicts an illustrative cloud-based system architecture that may be used in accordance with one or more illustrative aspects described herein.

With reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create clone documents using file management application 302 within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the file management server 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Clone Generation

While the above described environments help provide secure connections for users in a variety or environments, documents used by users in these environments may still be at risk of being disclosed in an unintended manner. Within these environments, additional security measures may be implemented to identify sources of any leak of confidential information.

The disclosed system may help identify a source of a leak of confidential information by generating a plurality of copies of a shared file. Rather than an exact copy, each copy may be a clone file with a plurality of differences from the original shared file. Each clone file may convey the same information with small semantic differences incorporated to make each file unique to each user. While sharing any file via file sharing system, such as SHAREFILE® by Citrix Systems, each unique copy may be generated for each person using natural-language processing (NLP) and machine learning (ML) techniques.

Figure 5:
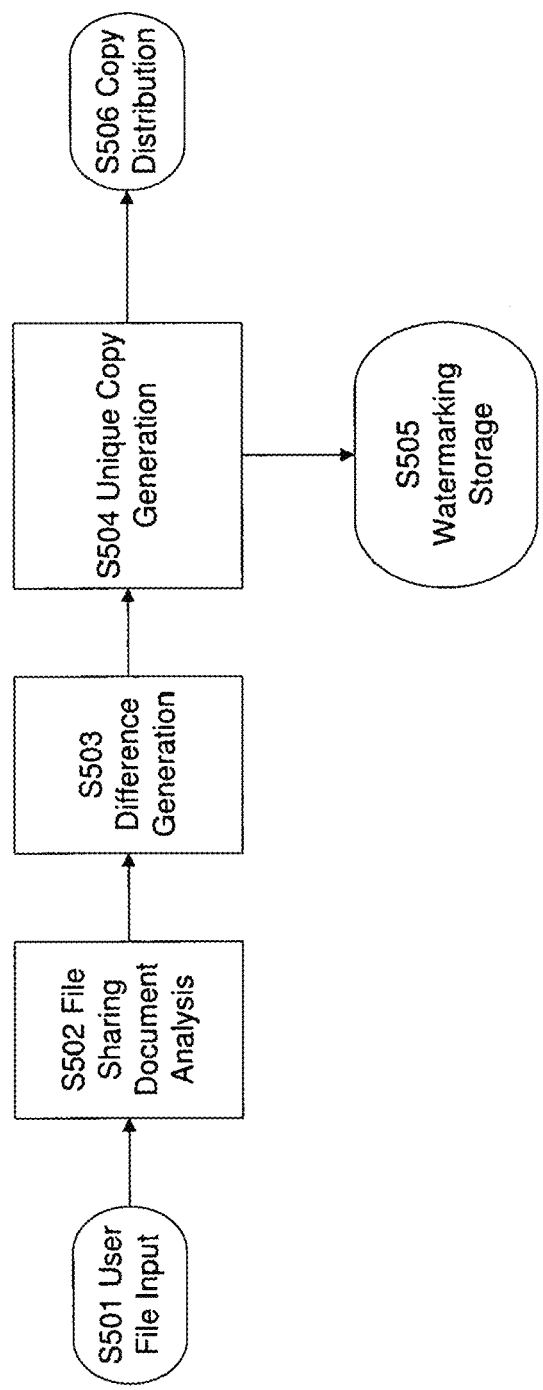
FIG. 5 depicts an illustrative file watermark generation process.

FIG. 5 represents a clone file generation process. When a user wants to share a file confidentially, the file sharing system enables a setting for secure sharing while sharing the file with N other people and proceed to upload to a file sharing application. When this setting is enabled, the back-end of the system may send the source file to the cloning service to generate unique copy of that file for each user.

In a file sharing application for storing files in a network environment, such as one of zones 401-402, a file is stored to the network by a file creator host device, such as one of client computers 411-414, in S501. After a file is uploaded to the file sharing system, a natural language processing function 332A may begin semantic file analysis in S502 to determine file segments for further processing. The natural language processing may determine a plurality of opportunities to alter a file in ways that not obvious to a user. Each of these opportunities may be identified as a semantic differencing element.

The natural language processing (NLP) may use machine learning to find insights and relationships in text. The text analysis may identify semantic differencing elements, including key phrases, places, people, brands, or events, and may determine to leave certain text unaltered or add consistencies or inconsistencies as to how certain terms are presented in each file. For example, for a text file service can apply NLP technique to generate a clone copy by determining semantic differencing elements for inserting/removing additional punctuation marks, using synonyms, and expanding/shortening phrases like "is not" to "isn't" and vice versa. The semantic file analysis may generate a sentence that is ideally identical in meaning, but includes a plurality of differences that may only be apparent after direct comparison between the clone file and the source file or between the clone file and another clone file.

In S503, a difference engine 332B may take the determined file segments from the natural language processing application 332A and generate a large number of possible alternative file segments for generating clone files. In order to generate clone files, the system may determine what data segments may be altered in a manner to make the files distinguishable from one another. This could be ensured by generating a difference score with respect to each clone file version. A difference score may be a value that represents the amount of difference between each file. That is, the difference score may be a value that represents the amount of difference between the clone file being generated and the original file to be shared, and between the clone file being generated and every other clone file generated. A difference score may be calculated by comparing the number of altered semantic differencing element to the size of the file. The difference score may be calculated by comparing the number of altered semantic differencing element for a particular clone copy of the file to the total number of possible semantic differencing elements determined in the original file.

For example, an original paragraph may read, "In this exercise, the idea is to write a paragraph that would be a random passage from a story. An effective paragraph is one that has unity (it isn't a hodgepodge of things), focus (everything in the paragraph stacks up to the whatever-it-is the paragraph is about), and coherence (the content follows smoothly). For this exercise, the paragraph should be quick to read—say, not be more than 100 words long." That paragraph may be altered (as shown by bracketing) to read, "[For] this exercise[ ]the idea is to write a paragraph that would be [an] [arbitrary] passage from a story. An effective paragraph is one that has unity (it [is not] a [hotchpotch] of things), focus (everything in the paragraph stacks up to the whatever[ ]-it-[ ]is the paragraph is about), and coherence (the content follows smoothly), [In] this exercise[ ]the paragraph should be quick to read[ ]-say, not be more than 100 words long[.]." As shown in this example, the alterations may include such things as altering word choices (e.g. changing "In" to "For"), removing or adding a comma, removing or adding spaces, removing or adding hyphens, changing hyphens to spaces, removing or adding contractions (e.g. changing "is not" to "isn't"), using alternate words or spellings (e.g. changing "random" to "arbitrary" or changing "hodgepodge" to "hotchpotch"), or adding extra punctuation marks.

In this example the difference score may be calculated by counting the number of differences (e.g. changed words, punctuation, spaces, etc.) and use that as a score. Using this scoring method, small changes (e.g. removing or adding a comma) add the same value to the total difference score as large changes (e.g. changing "random" to "arbitrary"), as all changes are worth a single value. Based on the example paragraphs provided above, a total difference score may be 12.

The difference score may also be calculated based on an amount of changes per character of text or pixels per frame image. With such a calculation, the difference score calculation may calculate difference score by counting a number of different characters, and different types of changes will have different associated score values. Using this scoring method, small changes (e.g. removing or adding a comma) add a smaller value to the total difference score than large changes (e.g. changing "random" to "arbitrary"), as all changes have a point value associated with the number of characters that may be changed. With such a calculation, adding or removing a comma or hyphen may add one point to a total score, changing "is not" to "isn't" may add two points to a total score, changing "In" to "For" may add three points to the total score, and changing "random" to "arbitrary" may add nine points to a total score. Based on a different character count difference value calculation for the sample paragraphs provided above, a total difference score may be 31 (e.g. 3+1+2+9+2+6+1+1+3+1+1+1=31).

The difference score may also be calculated based on weighting factors. Smaller point changes may be preferred, as small point value changes, such as removing a comma, are less noticeable to a reader of a text file. As such, small point value changes (e.g. 1-3 point changes) may be weighted by multiplying those changes by a larger weight value, while large point value changes (e.g. 7 point or greater changes) may be weighted by multiplying those changes by a smaller weight value. For example, the small point value changes (e.g. character point value changes or three or less) may be multiplied by five, the medium value point value changes (e.g. character point value changes of between four and seven) may be multiplied by one, and the large value point value changes (e.g. character point value changes of eight or more) may be divided by two. Using this scoring method, small changes add a larger relative value (e.g. removing or adding a comma changes a single character but may add 5 points to the total difference score) to the total difference score than large changes (e.g. changing "random" to "arbitrary" changes a nine characters but may add 4.5 points to the total difference score), as all changes are weighted. Based on a different character count difference value calculation for the sample paragraphs provided above, a total difference score may be 95.5 (e.g. ((3+1+2+2+1+1+3+1+1+1)*5)+(6*1)+(9*0.5)=95.5). It is to be understood that the foregoing weights and assigned values are examples and are non-exclusive and that there are other examples of how the disclosure may be practiced.

After the difference score is calculated, the difference score may be compared to a threshold difference value. The threshold difference value may be a value indicating the minimum about of differences between each of the clone file being generated, the original file to be shared, and every other clone file generated. The threshold difference value may be a pre-set value and/or may be a definable variable to be set by a system or file administrator. The threshold difference value may be dynamically changed based on the number of copies of the shared file that are generated and may be changed based on the type of scoring to be used. As the number of different copies generated, the threshold difference value may be dynamically reduced.

Alternatively, the difference score may be calculated based on a number of different letters/pixel/frames within a file. If the score for a particular clone is less than the threshold difference value, that clone file may be re-generated until the score meets the threshold difference value criteria. The generated differences may help a file or system administrator to identify and differentiate the altered content of a clone copy that is later leaked, especially when only a portion of that leaked file is recovered.

In addition, the difference score may be based on weighted factors. Each semantic change or semantic watermark may be assigned a difference weight based on the type of change made to the source file. For example, the addition of hyphens to certain words or phrases or altering the use of contracted phrases may be assigned a lower weight, as these types of changes may be considered a user writing preference that is less likely to be noticed by the user of a clone file. A greater number of these types of low weight changes may be introduced without a secondary user associated to the clone file becoming aware of the changes. Other changes, such as word synonym replacement which may be more apparent to a file user, may be assigned a higher weight. For example, significant changes in color to an image file or the use of synonyms or other alternative words may be given a higher weight. As these changes are more obvious to a secondary user, it may be preferable to limit the number of such changes. The weighted value of each change may be summed and the difference score between the clone copy being evaluation and both the source file and other clones may be compared to a threshold difference value. The difference score may be based on the total number of changes and the total weight associated with the changes.

Each of the different methods of calculating a difference score may have an associated threshold. For example, the different difference score calculations discusses above resulted in three different total difference scores (e.g. 12, 31, and 95.5). As the number of differences inserted into a particular file may vary with the size of the file, the threshold may also vary in keeping with the size of the file. For example, for a file including the example paragraph discussed above, the threshold may be 10, 25, and 65, depending on the method of calculating the total difference score. When a difference score for a generated clone file satisfies the associated threshold difference score (e.g. 10, 25, or 65), the clone file may be distributed to a user or user device. However, if five different versions of that file must be created, the threshold difference scores may be reduced to 7, 18, and 55.

In S504, a unique clone copy of a shared file is generated. By altering identified file segments, the system may generate a plurality of clone versions of each file, each of which is semantically identical. That is, the message of each file may be identical, but small differences in the language may be introduced to produce identifiable differences between different clone copies of the same file. Each file may include semantic differences and other hidden watermarks which may help identify a source of leak.

After the unique copy of the file is generated, in step S504, the unique qualities of that file are stored in a semantic watermarking storage database in S505. A difference database 332C may be a searchable table or database that is unique for each clone file. The database may identify each file segment that may be altered, as well as the particular alternative file segments generated by the difference engine 332B for the particular clone file. Each difference in a clone file is stored in portion of the table associated with a particular user to whom the clone file is to be distributed. The clone file may be presented to the user in a manner that is invisible to the user. A user identifier, entered to obtain access to the shared file, may also be stored in the area of the database storing the differences associated with the clone file transmitted to the user. In S506, the plurality of unique clone copies of the shared file may be distributed to users.

The semantic watermarking storage database may also store a file hash for each file. If the digital version of a leaked clone is recovered, a file hash may provide the source of a leak without any possibility of misidentifying the leaking party. However if only a portion of the file is recovered or a non-digital version of the clone file is recovered, the hash will not be able to identify the file. If a version of the file is leaked, a source may be identified as the source of a leak by running a recovered file through validation to determine the semantic differences or watermarks within the recovered file. However, the differences in each clone file must be significant enough so that no two clone copies of the shared file may be mistaken for each other.

Figure 6:
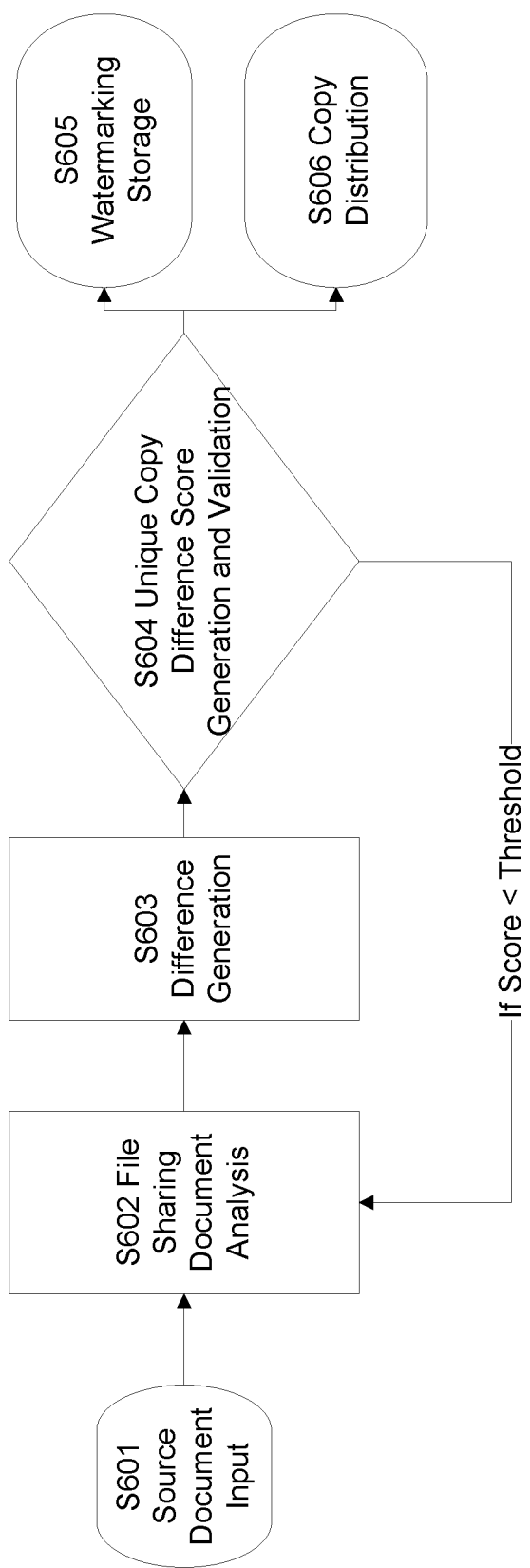
FIG. 6 depicts an illustrative file watermark generation and validation process.

FIG. 6 is an illustrative of a clone file generation process, with additional clone file difference validation. Some of the features depicted in FIG. 6 are similar in many respects to those described above with reference to FIG. 5 and may include additional features not mentioned above.

In S601, a file from a user device is stored using a file sharing application. The file sharing application may store files in a network environment, such as one of zones 401-402. After a file is uploaded to the file sharing system, the file will undergo file analysis in S602 utilizing a natural language processing function 332A to determine a plurality of opportunities to alter a file in ways that are not obvious to a user. Each of these opportunities may be identified as a semantic differencing element.

In S603, a clone copy of the source file based on differences selected from a plurality of differences that may be generated by a difference generation engine. In S604, each unique clone copy may undergo validation processing to ensure that the differences between the source file and each clone file. The validation process may include difference score generation to be used in determining significant differences between clone files. The difference score may be a value indicating the uniqueness between filed. The difference score may quantify a number of unique differences between each of the clone files. For text documents, the unique differences may be calculated on a per page basis or a per paragraph basis.

The difference score may be calculated and compared to a threshold difference value. If the score is less than a threshold, the scored is determined to indicate that the files are not substantial enough, and the file may be returned for further file analysis in S602 and further difference generation S603. This iterative loop may allow for the generation of extra or different semantic differences for large sets of users of the shared file or for making additional changes to increase the complexity of the changes when additional users access the shared file over a longer period of time.

For example, when a file is initially shared, the number of users may be limited to four unique users. To generate four unique clone copies, it may only be necessary to alter 10% of the identified semantic differencing elements to create differences. In addition, it may be advantageous for each clone file to be generated so that each of the differences generated are common between at least two of the clones, so that the differences are less detectable if different clone copies are being compared. However, if a group of 100 users each need a unique clone file, a larger number of differences will need to be generated. The uniqueness between each clone file will be more difficult to maintain. A larger percentage of the identified semantic differencing elements to create differences may be used to create differences in the clone files.

If the score does indicate that the differences are substantial enough for each created clone file to be uniquely identified, the differences/watermarks associated with that file may be stored in the watermarking storage database in S605. The newly generated copy of the file may then be distributed to the user or host device associated with a profile tied to the clone copy of the shared file in S606.

The file generation and distribution may be tied to a limited access database. The database may include an entry for each user ID, employee account, and/or email address associated with the clone copies to be distributed. The database may be tied to an access system that requires user authentication before file access. Access to a file may be limited to authenticated user cloud view-only access, or the file may be downloaded after user authentication. Access to the file may be limited to parties who receive a file specific link. Access to the file may also be logged. For example, shared file user IP addresses may be associated with the specific clone file being accessed, and additional viewing or downloading information, such as the time and date of any file access may be logged and stored with the watermark data associated with the particular clone file. The forgoing user access information may be used in combination with the changelog data to perform user access audit. The access information may be used as part of an audit trail (both digital/physical) to confirm the source of leak successfully after a comparison of a recovered leaked file with stored watermarking information, Intelligent Watermarking Leak Discovery FIG. 7 depicts an illustrative a process for determining the source of a leaked file based on semantic differences and watermarks included in clone versions of a shared file. When a file is leaked, the creator or provider of the file will be aware of whether the semantic watermarking was used to protect the file. As such, at least one party should know that the leaked file is a clone that is associated with a specific user. In S701, when a leaked version of a shared file is discovered, it may be input to the file management system for file analysis.

In S702, the leaked version of the file may be analyzed to determine areas of semantic differences. This analysis may include optical character recognition to upload limited data from screen shots or other incomplete version of a clone file. Initially, if digital version of the leaked file is recovered, a hash may be created and checked against the hashes retrieved from the watermark storage S703.

The differences retrieved from the watermark storage in S703 may also be transmitted to be used or retrieved for a plurality of individual differences comparisons in S704. Recovered screen shots or limited portions of a file may be compared against particular differences stored in the watermark database. As multiple clone files may include a plurality of the same semantic differences, the particular differences of the leaked clone file can be checked against all possible changes that may have been made to the original file, to determine which particular differences are present in the leaked clone file.

In S705, each identified difference discovered by the comparison, from the comparisons of S704, may be used to identify a particular clone file or generate a score associated with each clone file. This validation process will rely on multiple hidden alterations such that a system can detect the source of the leak with a high probability even if the duplicated content is randomly altered. If a complete clone file is recovered, a file hash may be used to identify the leak source. If the set of clone files is small, or the recovered leaked clone file is a complete version of the source file, the identified differences discovered by the comparison may be able to identify a particular generated clone file by associating each difference in the recovered clone file with differences retrieved from the watermark storage in S703.

This difference comparison may also confirm that unaltered portions of the source file have not been altered in the recovered file. If the generated differences and unaltered portions of the recovered leaked file completely match the differences retrieved from the watermark storage in S703, the system may be able to identify the particular clone file and associated user(s) of that file.

In some cases, only a portion of a leaked clone may be recovered. Each clone file may be generated with sufficient differences, determined by difference scores, such that a portion of any clone may be individually identifiable. As the number clone files increases, or as the number of differences increases in each clone, it may not be possible to associate the recovered clone file, or portion thereof, with a particular system created clone file.

If all the changes to a particular clone file cannot be confirmed, the system may generate a probability score for each clone file generated by the system. The score may be a probability based on the number of semantic watermarks generated from a source file. As only a portion of the leaked file may be recovered, the comparison may be based on only a portion of the source file that corresponds to the recovered portion of the leaked file, or may be based on the file as a whole. The score may indicate a percentage of possible generated differences and unaltered portions, associated with a possible change, from source file implemented in the recovered portion of the leaked file. Each previously generated clone file may be assigned a score and the cloned files may be ranked based on their associated score.

In S706, a user probability will be output to the user providing the leaked file for discovery procedures. The user leak probability presented may identify a single user if all other possible leaks have been eliminated. The user leak probability presented may be associated with a plurality of probabilities associated with a plurality of clone files. The probabilities may be associated with particular users to whom the associated clone files were distributed. The user leak probabilities may also be associated with a class of users, such as users from a particular sub-contractor, if each clone file is distributed to more than one individual.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   receiving, by a computing device, a file from a user, the file to be shared with a plurality of secondary users;
   determining, by the computing device, a plurality of semantic differencing elements based on the file received from the user;
   generating, by the computing device and for each of the plurality of secondary users, a copy of the file based on the plurality of semantic differencing elements, wherein the generating, by the computing device and for each of the plurality of secondary users, the copy of the file based on the plurality of semantic differencing elements further comprises:
      generating a difference score for the copy of the file,
      comparing, by the computing device, the difference score to a threshold, wherein the threshold is dynamically modified based on a number of copies of the file generated and a type of scoring used to generate the difference score, and
      after the difference score satisfies the threshold, providing a secondary user access to the copy of the file associated with the secondary user; and
   generating, by the computing device and for each copy of the file, a record that associates the copy of the file with a secondary user and identifies at least one semantic difference between the file and the copy of the file.

2. The method of claim 1, further comprising:
   receiving, by the computing device, a request to access the file; and
   authenticating, by the computing device, a secondary user based on user authentication data.

3. The method of claim 2, further comprising:
   logging, by the computing device, the user authentication data and access information,
   wherein the user authentication data is associated with a copy of the file assigned to the secondary user, and the access information is associated with the copy of the file assigned to the secondary user and comprises a time and date of each access to the copy of the file by the secondary user.

4. The method of claim 2, further comprising:
   after authenticating the secondary user, providing access to the copy of the file associated with the secondary user.

5. The method of claim 1, wherein the generating the difference score for the copy of the file further comprises:
   determining a number of differences between the copy of the file and the file;
   determining numbers of differences between each copy of the file; and
   determining the difference score based on the number of differences between the copy of the file and the file and based on the numbers of differences between the each copy of the file, wherein determining the difference score based on the number of differences between the copy of the file and the file and based on the numbers of differences between the each copy of the file comprises:
      assigning a difference value to each identified difference, wherein each difference value is weighted based on a type of change made to result in the corresponding identified difference, and
      adding the difference values together to compute the difference score.

6. The method of claim 1, further comprising:
   receiving, by the computing device, a recovered file;
   comparing, by the computing device, the recovered file to differences associated with the file; and
   determining, based on the comparing, a secondary user associated with the recovered file.

7. The method of claim 6, further comprising:
   determining a portion of the file to which the recovered file corresponds; and
   retrieving a portion of the plurality of semantic differencing elements, associated with the file, corresponding to the portion of the file to which the recovered file corresponds,
   wherein the comparing, by the computing device, the recovered file to the differences associated with the file comprises comparing the recovered file to the portion of the file to which the recovered file corresponds.

8. The method of claim 6, wherein the determining, based on the comparing of the recovered file to differences associated with the file, the secondary user associated with the recovered file comprises:
   determining, based on the comparing of the recovered file to differences associated with the file, a probability score for each copy of the file; and
   providing a ranking of each copy of the file based on the probability score for each copy of the file.

9. The method of claim 6, further comprising:
   providing, to the user, information identifying the secondary user associated with the recovered file and information about the recovered file based on the differences associated with the file.

10. An apparatus comprising:
    at least one processor; and
    memory storing executable instructions that, when executed by the at least one processor, cause the apparatus to:
       process a file, to be shared with a plurality of secondary users, to determine a plurality of semantic differencing elements based on the file received from a user;
       generate, for each of the plurality of secondary users, a copy of the file for each of the plurality of secondary users based on the plurality of semantic differencing elements, wherein the generating, for each of the plurality of secondary users, the copy of the file based on the plurality of semantic differencing elements further comprises:
          generating a difference score for the copy of the file,
          comparing the difference score to a threshold, wherein the threshold is dynamically modified based on a number of copies of the file generated and a type of scoring used to generate the difference score, and
          after the difference score satisfies the threshold, providing a secondary user access to the copy of the file associated with the secondary user; and
       store, for each copy of the file assigned to one of the plurality of secondary users and with the file, a record of a plurality of changes to the file made to generate each copy of the file.

11. The apparatus of claim 10, wherein the apparatus is further configured to:
    receive a request to access the file;
    authenticate a secondary user based on user authentication data; and
    log the user authentication data and access information of the secondary user,
    wherein the user authentication data is associated with a copy of the file assigned to the secondary user, and the access information is associated with the copy of the file assigned to the secondary user and comprises a time and date of access to the copy of the file by the secondary user.

12. The apparatus of claim 10, wherein the apparatus is further configured to:
receive a recovered file;
compare the recovered file to differences associated with the file; and
determine, based on a comparison of the recovered file and the file, one of the plurality of secondary users associated with the recovered file.

13. The apparatus of claim 12, wherein the apparatus is further configured to:
determine a portion of the file to which the recovered file corresponds; and
retrieve a portion of the plurality of semantic differencing elements, associated with the file, corresponding to the portion of the file to which the recovered file corresponds,
wherein the apparatus is further configured to compare the recovered file to semantic differencing elements of the portion of the file to which the recovered file corresponds.

14. The apparatus of claim 12, wherein the apparatus is further configured to:
determine, based on comparing the recovered file to differences associated with the file, a probability score for each copy of the file; and
provide a ranking of each copy of the file based on the probability score for each copy of the file.

15. One or more non-transitory computer-readable media storing instructions configured to, when executed by at least one processor, cause a computing device to:
receive a file from a user, the file to be shared with a plurality of secondary users;
determine a plurality of semantic differencing elements based on the file received from the user;
generate, for each of the plurality of secondary users, a copy of the file based on the plurality of semantic differencing elements, wherein the generating, by the computing device and for each of the plurality of secondary users, the copy of the file based on the plurality of semantic differencing elements further comprises:
generating a difference score for the copy of the file,
comparing, by the computing device, the difference score to a threshold, wherein the threshold is dynamically modified based on a number of copies of the file generated and a type of scoring used to generate the difference score, and
after the difference score satisfies the threshold, providing a secondary user access to the copy of the file associated with the secondary user; and
generate, for each copy of the file, a record that associates the copy of the file with a secondary user and identifies at least one semantic difference between the file and the copy of the file.

16. The one or more non-transitory computer-readable media of claim 15, wherein the instructions are configured to, when executed, cause the computing device to:
receive a request to access the file;
authenticate a secondary user based on user authentication data; and
log the user authentication data and access information, wherein the user authentication data is associated with a copy of the file assigned to the secondary user, and the access information is associated with the copy of the file assigned to the secondary user and comprises a time and date the copy of the file is accessed.

17. The one or more non-transitory computer-readable media of claim 15, wherein the instructions are configured to, when executed, cause the computing device to:
receive a recovered file;
compare the recovered file to differences associated with the file; and
determine, based on a comparison of the recovered file to the file, a user associated with the recovered file.

18. The method of claim 1, wherein generating the copy of the file based on the plurality of semantic differencing elements comprises one or more of: inserting additional punctuation marks, removing punctuation marks, replacing one or more words with synonyms of the one or more words, replacing a contraction with a phrase corresponding to the contraction, replacing the phrase corresponding to the contraction with the contraction, altering word choices, replacing a space with a hyphen, replacing a hyphen with a space, or altering word spelling.

19. The apparatus of claim 10, wherein the apparatus is further configured to generate the difference score for the copy of the file by:
determining a number of differences between the copy of the file and the file;
determining numbers of differences between each copy of the file; and
determining the difference score based on the number of differences between the copy of the file and the file and based on the numbers of differences between the each copy of the file, wherein determining the difference score based on the number of differences between the copy of the file and the file and based on the numbers of differences between the each copy of the file comprises:
assigning a difference value to each identified difference, wherein each difference value is weighted based on a type of change made to result in the corresponding identified difference, and
adding the difference values together to compute the difference score.

20. The one or more non-transitory computer-readable media of claim 15, wherein the instructions are configured to, when executed, cause the computing device to generate the difference score for the copy of the file by:
determining a number of differences between the copy of the file and the file;
determining numbers of differences between each copy of the file; and
determining the difference score based on the number of differences between the copy of the file and the file and based on the numbers of differences between the each copy of the file, wherein determining the difference score based on the number of differences between the copy of the file and the file and based on the numbers of differences between the each copy of the file comprises:
assigning a difference value to each identified difference, wherein each difference value is weighted based on a type of change made to result in the corresponding identified difference, and
adding the difference values together to compute the difference score.

* * * * *